(12) United States Patent
Horton

(10) Patent No.: US 10,266,324 B2
(45) Date of Patent: Apr. 23, 2019

(54) ADJUSTABLE FASTENING DEVICE AND METHOD OF USING SAME

(71) Applicant: Michael William Horton, Mackay (AU)

(72) Inventor: Michael William Horton, Mackay (AU)

(*) Notice: Subject to any disclaimer, the term of this patent is extended or adjusted under 35 U.S.C. 154(b) by 43 days.

(21) Appl. No.: 15/708,076

(22) Filed: Sep. 18, 2017

(65) Prior Publication Data

US 2018/0079571 A1    Mar. 22, 2018

(30) Foreign Application Priority Data

Sep. 20, 2016  (AU) ............................... 2016903786

(51) Int. Cl.
| | | |
|---|---|---|
| *B65D 63/16* | (2006.01) | |
| *F16B 2/06* | (2006.01) | |
| *F16G 11/04* | (2006.01) | |
| *F16G 11/12* | (2006.01) | |
| *F16G 11/14* | (2006.01) | |

(52) U.S. Cl.
CPC ............. *B65D 63/16* (2013.01); *F16B 2/065* (2013.01); *F16G 11/048* (2013.01); *F16G 11/12* (2013.01); *F16G 11/14* (2013.01)

(58) Field of Classification Search
CPC ....... Y10T 24/1412; F16B 33/08; F16L 25/04; F16L 21/005; B60P 7/0823; B60P 3/079
USPC .................. 248/499, 500, 507; 24/278, 281
See application file for complete search history.

(56) References Cited

U.S. PATENT DOCUMENTS

| | | | |
|---|---|---|---|
| 375,893 | A | 1/1888 | Pepper, Jr. |
| 386,076 | A | 7/1888 | Leavitt |
| 1,819,768 | A | 8/1931 | Coffing |
| 2,309,769 | A | 2/1943 | Hubbard |
| 2,489,535 | A | 11/1949 | Montague |
| 2,621,383 | A | 12/1952 | Tresidder et al. |
| 2,989,142 | A | 6/1961 | Gill |
| 3,123,426 | A | 3/1964 | Leto et al. |

(Continued)

FOREIGN PATENT DOCUMENTS

| | | |
|---|---|---|
| EP | 2309081 | 12/2009 |
| FR | 2855580 | 5/2003 |
| GB | 566348 | 2/1943 |

*Primary Examiner* — Steven M Marsh
(74) *Attorney, Agent, or Firm* — Martin IP Pty Ltd

(57) ABSTRACT

There is provided an adjustable fastening device configured to engage a support to provide a tether for the attachment of a tensioned line. The adjustable fastening device includes a plate, and an adjustable collar configured to extend around the support and securely engage with the plate in operation. There is also provided a tensioning mechanism configured to seat against the support and extend in length to drive the support and the plate apart in operation when the plate is securely engaged with the collar. In this way the plate is moved away from the support to thereby securely engage the collar against the support on an opposed side of the support from the tensioning mechanism. The tensioning mechanism includes a rigidly connected foot. The foot includes a surface configured for engaging with the support in operation and preventing the tensioning mechanism being unseated from the support by tension in the collar acting in a direction perpendicularly to the direction of elongation of the tensioning mechanism.

18 Claims, 4 Drawing Sheets

(56) References Cited

U.S. PATENT DOCUMENTS

| | | | |
|---|---|---|---|
| 3,309,749 A | | 3/1967 | Gill |
| 4,813,109 A | | 3/1989 | McCully et al. |
| 4,828,210 A | | 5/1989 | Anderson et al. |
| 5,035,084 A | | 7/1991 | Towns |
| 5,161,487 A | * | 11/1992 | Miller ..................... A01K 1/04 119/780 |
| 5,344,115 A | | 9/1994 | Mayne et al. |
| 5,738,329 A | | 4/1998 | Woodward |
| 5,971,668 A | * | 10/1999 | Miller ................ A62B 35/0068 119/770 |
| 6,021,983 A | * | 2/2000 | Congdon ............... G02B 23/18 224/909 |
| 6,609,688 B1 | * | 8/2003 | Mazzella ............... B21D 37/14 248/188.2 |
| 8,393,666 B1 | * | 3/2013 | Rhoton ................. B60P 7/0807 296/43 |
| 9,010,487 B2 | * | 4/2015 | Cruz ................... E04G 21/3276 182/3 |
| 9,539,929 B2 | * | 1/2017 | VanValkenburgh ........................ B60P 7/0807 |
| 9,810,285 B2 | * | 11/2017 | McNeilly ................ F16G 11/12 |
| 2004/0261953 A1 | | 12/2004 | Hart |
| 2006/0097123 A1 | * | 5/2006 | Gallien ................. A47B 97/00 248/500 |

\* cited by examiner

ADJUSTABLE FASTENING DEVICE AND METHOD OF USING SAME

FIELD OF THE INVENTION

The present disclosure relates to an adjustable fastening device configured to engage a support and a method of using the adjustable fastening device configured to engage a support.

BACKGROUND

Tethering flexible materials to a support or pole at a readily adjustable position on the support or pole may be of significant interest. Such tethering may occur around a building, be associated with outdoor activities, be for privacy, to advertise products, or to shield people, animals or plants from the elements, primarily sun and rain.

Primarily a health risk, but also a matter of physical comfort, the negative effects of long term exposure to sun is well known to those skilled in the art. A wide variety of awnings, sunshades, sails, screens, etc. are produced to provide shelter. Anchoring such awnings, sunshades, sails, screens, etc. is typically permanent or temporary but at a fixed position.

Mounting of banners, sails, screens, signs, nets etc. is complicated by customary location of fixed anchor points. Such fixed anchor points require adjustment or accommodation by ropes, wires, cables and the like to tether such banners, sails, screens, signs, nets etc. to the fixed anchor point(s).

SUMMARY

The following is a broad summary of various exemplary embodiments of an adjustable fastening device configured to engage a support. The present disclosure also relates to methods of using the adjustable fastening device configured to engage a support.

According to an embodiment, there is provided an adjustable fastening device configured to engage a support, the adjustable fastening device including a plate, an adjustable member securely engageable with the plate, and a biasing means, the biasing means being configured to seat against the support in operation, the biasing means also being configured for secure engagement with the plate, wherein in operation the biasing means is configured to bias the plate away from the support to cause the secure engagement of the adjustable member with the support; and wherein the biasing means includes a rigidly connected foot for engagement with the support, the foot including a flat surface configured for engaging with the support in operation and preventing the tensioning mechanism being unseated from the support by tension in the adjustable member.

The biasing means may include a support engagement member, and the plate include an aperture therethrough configured to receive the support engagement member, such that in use the support engagement member engages the support and the biasing means biases the plate to moveably space apart the plate from the support to create a clamping tension on opposed sides of the support between a portion of the adjustable member and the support engagement member.

The aperture may include an internal thread formation and the support engagement member may include a complementary external thread formation, such that in use the support engagement member is received in the aperture and rotation of the support engagement member about a longitudinal axis of the support engagement member spaces apart a distal end of the support engagement member relative to the plate. The complementary external thread formation of the support engagement member may extend along a majority of the support engagement member.

The support engagement member may have a distal end with a foot configured to engage the support, and a proximal end opposite the distal end, the proximal end may include a handle. The foot may be a non-tilt swivel foot.

The support engagement member may include a rigidly connected foot. The foot may include a surface configured for engaging with the support in operation, and preventing the tensioning mechanism being unseated from the support by tension in the adjustable member acting in a direction perpendicularly to the direction of elongation of the support engagement member.

The adjustable member may include a tether engagement member configured to secure a tether.

According to another embodiment, there is provided an adjustable fastening device configured to engage a pole. The adjustable fastening device may include a plate having an aperture therethrough, a circumferentially adjustable member engageable with the plate, and a pole engagement member may be configured to moveably space apart the plate from the pole while the adjustable member is engaged with the plate and wrapped around the pole to create a clamping tension on opposed sides of the pole between a portion of the adjustable member and the pole engagement member; wherein the pole engagement member includes a rigidly connected foot, the foot being configured for resisting the unseating of the pole engagement member in operation.

The pole engagement member may be configured to rotationally engage with the plate.

The pole engagement member may include a threaded shaft along a majority of its length.

The pole engagement member may have a distal end with a foot configured to engage the pole, and a proximal end opposite the distal end, the proximal end including a handle. The foot may be a non-tilt swivel foot.

The adjustable member may include a plurality of independently moveable members, such as a chain. The adjustable member may include a tether engagement member configured to secure a tether, the tether engagement member may be a clamp, webbing, a carabiner, a D shackle, a double U bolt, an eye bolt, a hook, a hook bolt, a rope grip, an S hook, an eye nut, a snap hook, a turnbuckle, or a U bolt.

According to an embodiment, there is provided a method of tethering an object to a support that includes wrapping an adjustable member around a support, securely engaging the adjustable member with a plate, seating a rigidly connected foot of a tensioning mechanism on the support between the support and the plate; and spacing the plate from the support using the tensioning mechanism to create a tension in the adjustable member, to thereby secure the adjustable member to the support.

According to an embodiment, there is provided a method of tethering an object to a pole that includes wrapping an adjustable member around the pole and spacing apart a plate from the pole while the adjustable member is engaged with the plate and wrapped around the pole to create a clamping tension on opposed sides of the pole between a portion of the adjustable member and the pole engagement member.

In another aspect there is provided an adjustable fastening device configured to engage a support, the adjustable fastening device comprising a plate; an adjustable collar configured to extend around the support and securely engage with the plate in operation; and a tensioning mechanism, the tensioning mechanism being configured to seat against the support and extend in length to drive the support and the plate apart in operation when the plate is securely engaged with the collar, to thereby move the plate away from the support and to securely engage the collar against the support on an opposed side of the support from the tensioning mechanism; the tensioning mechanism including a rigidly connected foot, the foot including a flat surface configured for engaging with the support in operation and preventing the tensioning mechanism being unseated from the support by tension in the collar acting in a direction perpendicularly to the direction of elongation of the tensioning mechanism.

The accompanying drawings, which are incorporated in and constitute a part of this specification, illustrate several embodiments of the invention and together with the description, serve to explain the principles of the invention.

Embodiments of the invention are now described, by way of example, with reference to the accompanying drawings.

DETAILED DESCRIPTION OF THE DRAWINGS

The present disclosure is directed, at least in part, to an adjustable fastening device configured to engage a support. The present disclosure also encompasses a method of tethering an object to a support.

Figure 1:
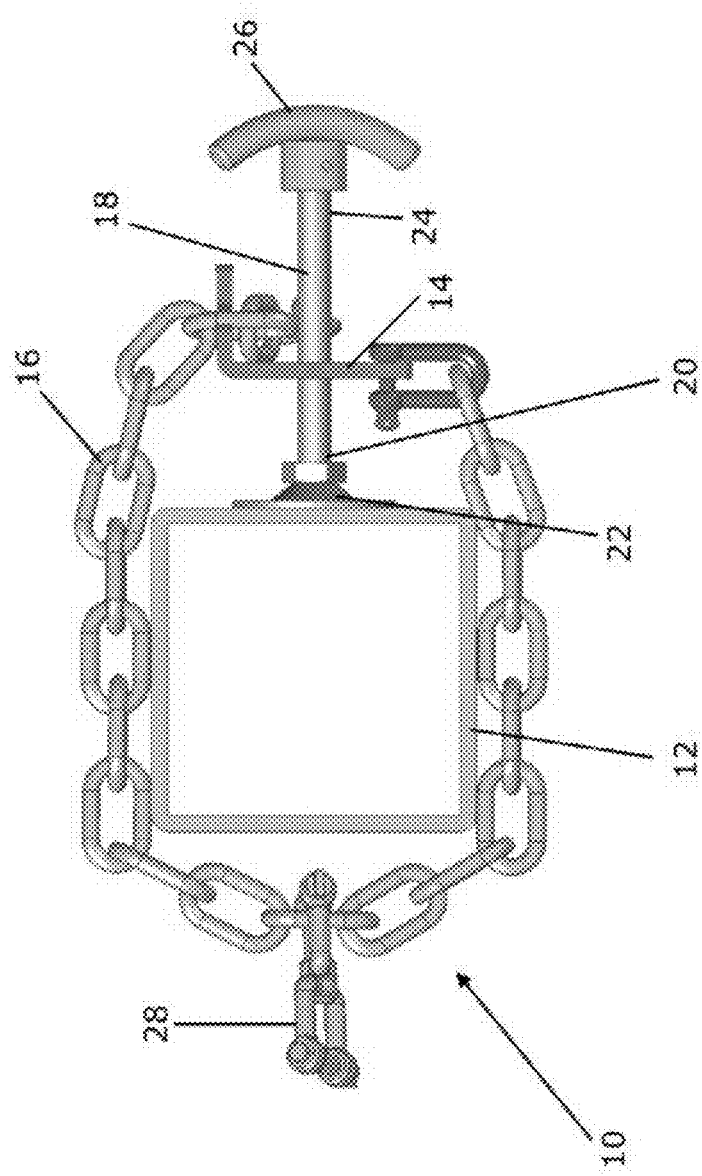
FIG. 1 shows a plan view of an adjustable fastening device engaging a support.
Figure 2:
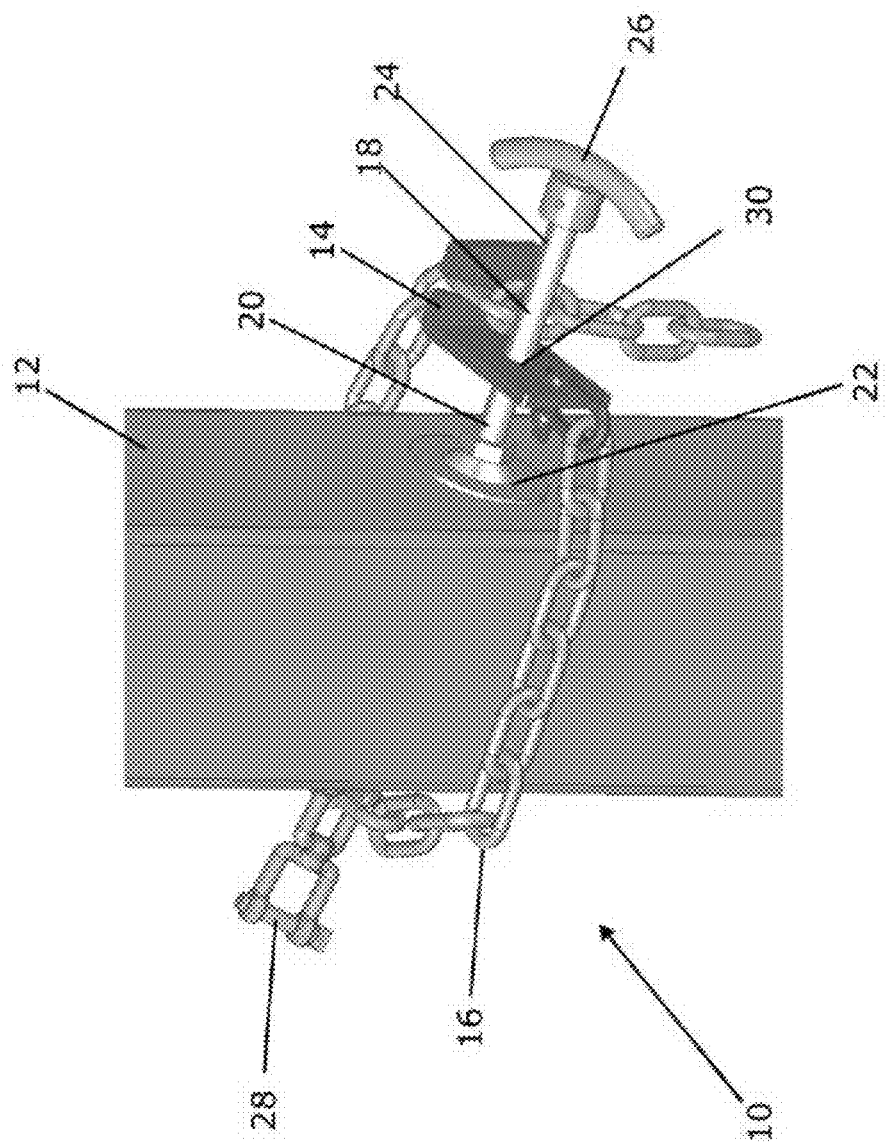
FIG. 2 shows a top perspective view of an adjustable fastening device engaging a support.

Referring to FIGS. 1 and 2, reference numeral 10 generally refers to an embodiment of an adjustable fastening device configured to engage a support 12. The adjustable fastening device 10 includes a plate 14; an adjustable member such as collar 16 securely engageable with the plate 14; and a biasing means or tensioning mechanism including a support engagement member 18. In use the adjustable member 16 engages the support 12 and is securely engaged with the plate 14, and the support engagement member 18 biases the plate 14 and adjustable member 16 into a locked engagement with the support 12. The plate 14 includes an aperture 30 therethrough as shown in FIG. 2 configured to receive the support engagement member 18.

In use the support engagement member 18 engages the support 12 and the support engagement member 18 biases the plate 14 to moveably space apart the plate 14 from the support 12 to create a clamping tension on opposed sides of the support 12 between a portion of the adjustable member 16 and the support engagement member 18.

The aperture 30 includes an internal thread formation (not shown) and the support engagement member 18 includes a complementary external thread formation along its length (not shown), such that in use the support engagement member 18 is received in the aperture 30 and rotation of the support engagement member 18 about a longitudinal axis of the support engagement member 18 spaces apart a distal end 20 of the support engagement member 18 relative to the plate 14.

The complementary external thread formation of the support engagement member 18 extends along a majority of the length of the support engagement member 18.

The support engagement member 18 has a distal end 20 and a proximal end 24 opposite the distal end. A non-tilting swivel foot 22 is rigidly engaged to the support engagement member at its distal end 20. The foot 22 includes a surface that is configured to securely engage the support 12 in use. The proximal end 24 of the support engagement member 18 includes a handle 26 for being turned manually. Turning of the handle results in the driving apart of the plate and the support by the support engagement member acting on the plate via its external threads acting on the internal threads of the plate. In this way the adjustable member is tensioned up to securely engage with the support on an opposed side of the support from the support engagement member. The adjustable member 16 includes a tether engagement member 28 configured to secure a tether.

Figure 4:
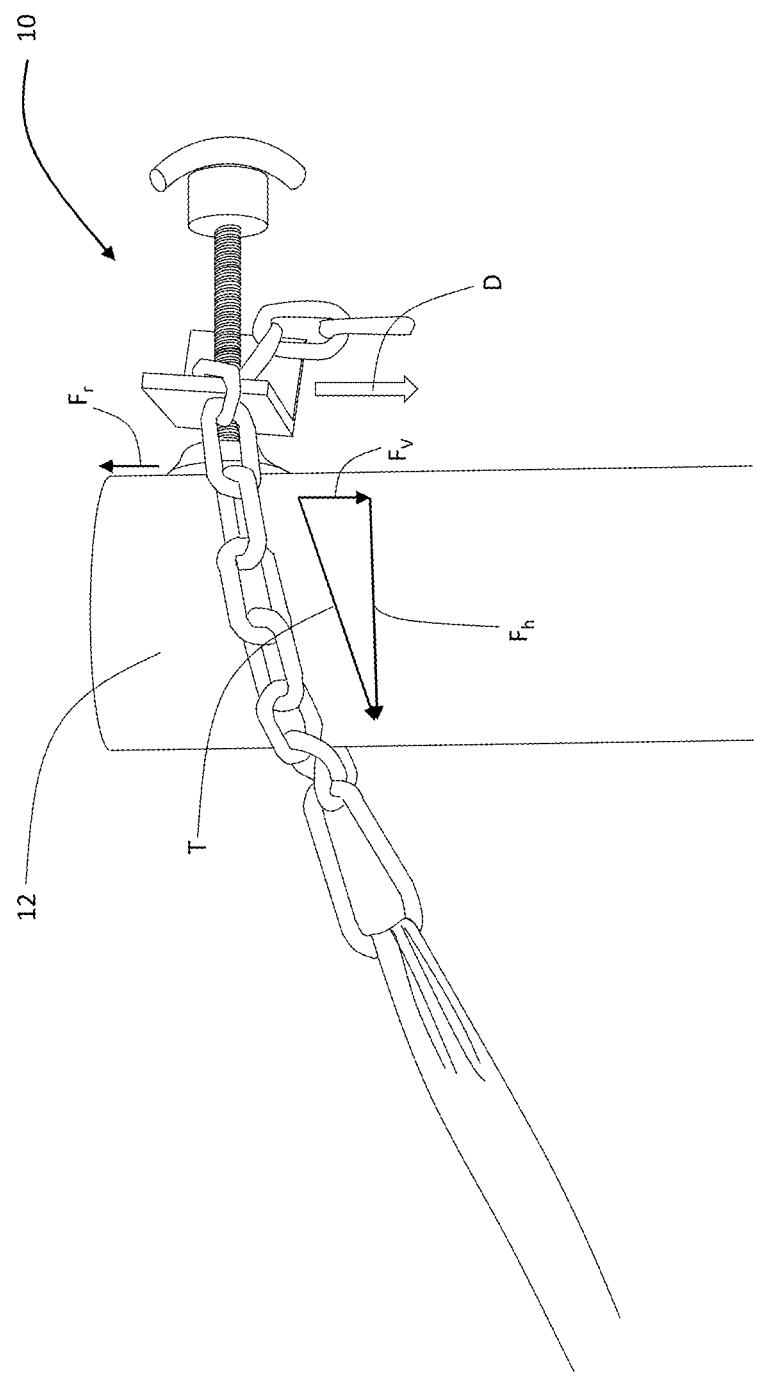
FIG. 4 shows a perspective view of an adjustable fastening device engaging a support.

The foot prevents the tensioning mechanism or support engagement member 18 from being unseated from the support by tension in the collar 16 acting in a direction perpendicularly to the direction of elongation of the tensioning mechanism. This is illustrated in FIG. 4. Tension force acting on the chain is shown as a vector T having a magnitude and a direction. A vertical component of this vector T is shown as $F_v$ and a horizontal component of vector T is shown as $F_h$. The horizontal component $F_h$ of tension T pushes the support engagement member 18 into the support making it engage more securely with the support. The horizontal component $F_h$ is resisted by the strength of the pole.

Vertical component $F_v$ of tension T is resisted by the friction $F_r$ of the chain and foot acting on the pole. However vertical component $F_v$ acting on the plate, also generates a torque that acts to unseat the foot of the support engagement member 18 from the support, for example by toppling the support engagement member over. The rigid foot acts to support the support engagement member 18 against being unseated by resisting the torque generated by $F_v$ about the area where the foot is seated.

If the support engagement member 18 were unseated to move downwardly at the plate (shown as arrow D in FIG. 4), the tension in the chain would be released and the adjustable fastening device would slide down the support.

In addition, by providing the rigid foot with a preferably flat engagement surface, the tensioning mechanism can be loosened and can be conveniently slided up or down the support, allowing a user to adjust the position of the adjustable fastening device 10 on the support according to changes in position of the sun, where, for example, the adjustable fastening device 10 is being used to hold a shade sail in position.

Figure 3:
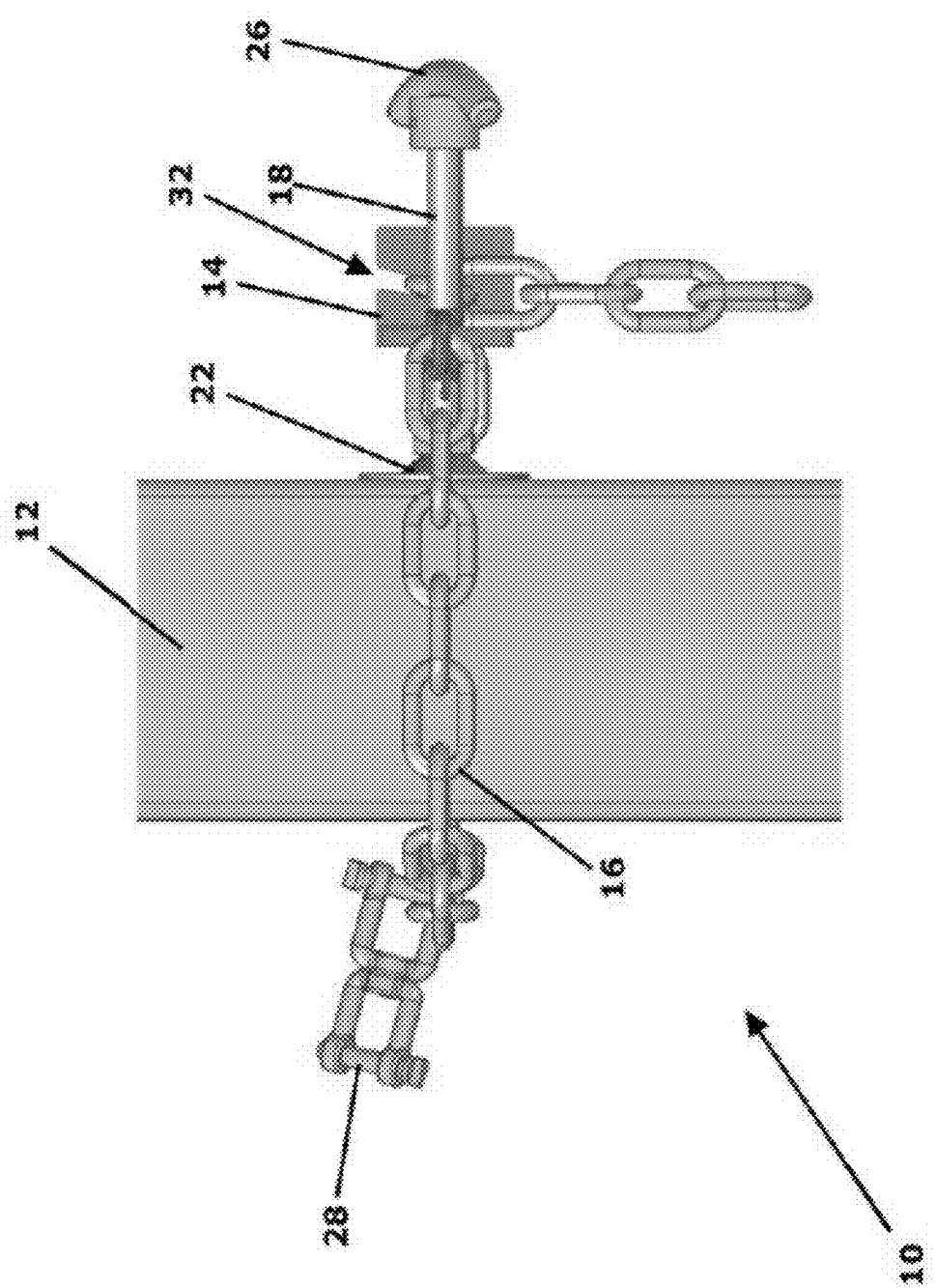
FIG. 3 shows a plan view of an adjustable fastening device engaging a support.

Referring to FIG. 3, the adjustable fastening device 10 includes a plate 14 having a catch in the form of a notch 32, for engaging and securing the collar 16. The adjustable member 16 is securely engageable with the plate 14 by being received in the notch 32. The support engagement member 18 includes external threads that engage with internal threads in the aperture biases the plate 14 and adjustable member 16 into a secure engagement with the support 12. The support engagement member 18 has a non-tilt swivel foot 22 configured to engage the support 12, and a handle 26. The adjustable member 16 includes a tether engagement member 28 configured to secure a tether.

Having described preferred embodiments of an adjustable fastening device configured to engage a support, a preferred method of use will now be described with reference to FIGS.

1-3. An object such as an awning cord is tethered to a support 12 by wrapping an adjustable member 16 around the support 12, and securely engaging the adjustable member 16 with a plate 14. The plate 14 is spaced from the support 12 by a support engagement member 18 to create a tension between the adjustable member 16, plate 14 and support 12.

The foregoing description is by way of example only, and may be varied considerably without departing from the scope of the disclosure. For example only, the adjustable member may be a flexible adjustable member or a rigid adjustable member. Flexible adjustable members are contemplated that include fibre ropes, wire ropes and cables, chains, snap-fit braces, and the like.

The tether engagement member may be a clamp, a D shackle, a double U bolt, eye bolts, a hook, a hook bolt, a rope grip, an S hook, an eye nut, a snap hook, a turnbuckle, or a U bolt.

The biasing means biasing the plate and the collar relative to the support may be elastic or viscoelastic. In other embodiments, the biasing means includes an elastomer. The elastomer is envisaged to include unsaturated rubber, saturated rubber, a thermoplastic elastomer and various combinations of the aforementioned. In such embodiments, the biasing means may be elastically compressed between the plate and the support and bias the plate and adjustable member into locked engagement with the support.

The biasing means may be a spring. Springs contemplated include cantilever springs, compression springs, constant springs, flat springs, gas springs, helical springs, leaf springs, machined springs, serpentine springs, spring washers, tension springs, torsion springs, variable springs, volute springs, wave spring, and the like. In such embodiments, the spring may be elastically compressed between the plate and the support and bias the plate and adjustable member into locked engagement with the support.

The biasing means may be a scissor jack, a screw jack, and the like. In one such embodiment, the scissor jack may be extended between the plate and the support and bias the plate and adjustable member into locked engagement with the support.

The support engagement member may be longitudinally displaced so that in use the adjustable member engages the support and is securely engaged with the plate, and the support engagement member biases the plate and adjustable member into a locked engagement with the support. Such longitudinal displacement may be due to ratcheted displacement, snap-fit displacement, and the like.

Embodiments are also contemplated wherein the plate may be flat or curved. The plate may include an interlocking arrangement, a hook, a stud, a winch or the like to securely engage with the adjustable member.

The adjustable fastening device may be used to tether a sail, an awning, a screen, a sign, a banner, a net or the like to a support.

It is further envisaged that the adjustable fastening device can include one or more lock-nuts that are moveable on the thread of the support engagement member 18. Such lock-nuts can be used to hold the plate in position on the support engagement member 18 once the chain has been tensioned by turning the handle on the support engagement member.

The support may be a building or part thereof, a pole, a beam, or the like.

It is to be understood that the terminology employed above is for the purpose of description and should not be regarded as limiting. The described embodiments are intended to be illustrative of the invention, without limiting the scope thereof. The invention is capable of being practiced with various modifications and additions as will readily occur to those skilled in the art.

The features described with respect to one embodiment may be applied to other embodiments, or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An adjustable fastening device configured to engage a support, the adjustable fastening device comprising:
    a plate;
    an adjustable member securely engageable with the plate; and
    a biasing means, the biasing means being configured to seat against the support in operation, the biasing means also being configured for secure engagement with the plate,
    wherein in operation the biasing means is configured to bias the plate away from the support to cause the secure engagement of the adjustable member with the support;
    and wherein the biasing means includes a rigidly connected foot for engagement with the support, the foot including a flat surface configured for engaging with the support in operation and preventing the tensioning mechanism being unseated from the support by tension in the adjustable member.

2. The adjustable fastening device according to claim 1, wherein the adjustable member is a flexible adjustable member.

3. The adjustable fastening device according to claim 1, wherein the adjustable member is a rigid adjustable member.

4. The adjustable fastening device according to claim 1, wherein the biasing means includes:
    a support engagement member, and the plate includes an aperture therethrough configured to receive the support engagement member,
    such that in use the support engagement member engages the support and the biasing means biases the plate to moveably space apart the plate from the support to create a clamping tension on opposed sides of the support between a portion of the adjustable member and the support engagement member.

5. The adjustable fastening device according to claim 4, wherein the aperture includes an internal thread formation and the support engagement member includes a complementary external thread formation, such that in use the support engagement member is received in the aperture and rotation of the support engagement member about a longitudinal axis of the support engagement member spaces apart a distal end of the support engagement member relative to the plate.

6. The adjustable fastening device according to claim 5, wherein the complementary external thread formation of the support engagement member extends along a majority of the length of the support engagement member.

7. The adjustable fastening device according to claim 4, wherein the support engagement member includes a distal end from which the foot extends, and a proximal end opposite the distal end, the proximal end including a handle.

8. The adjustable fastening device according to claim 1, wherein the adjustable member includes a tether engagement member configured to secure a tether.

9. The adjustable fastening device according to claim 8, wherein the tether engagement member is selected from the group consisting of a clamp, webbing, a carabiner, a D shackle, a double U bolt, an eye bolt, a hook, a hook bolt, a rope grip, an eye nut, an S hook, a snap hook, a turnbuckle; and a U bolt.

10. An adjustable fastening device configured to engage a pole, comprising:
   a plate having an aperture therethrough;
   a circumferentially adjustable member engageable with the plate; and
   a pole engagement member configured to seat against the pole and moveably space apart the plate from the pole while the adjustable member is engaged with the plate and wrapped around the pole to create a clamping tension on opposed sides of the pole between a portion of the adjustable member and the pole engagement member, wherein the pole engagement member includes a rigidly connected foot, the foot being configured for resisting an unseating of the pole engagement member in operation.

11. The adjustable fastening device according to claim 10, wherein the pole engagement member is configured to rotationally engage with the plate.

12. The adjustable fastening device according to claim 10, wherein the pole engagement member has a distal end with a foot configured to engage the pole, and a proximal end opposite the distal end, the proximal end including a handle.

13. The adjustable fastening device according to claim 10, wherein the adjustable member includes a plurality of independently moveable members.

14. The adjustable fastening device according to claim 10, wherein the adjustable member includes a tether engagement member configured to secure a tether.

15. The adjustable fastening device according to claim 14, wherein the tether engagement member is selected from the group consisting of a clamp, webbing, a carabiner, a D shackle, a double U bolt, an eye bolt, a hook, a hook bolt, a rope grip, an eye nut, an S hook, a snap hook, a turnbuckle; and a U bolt.

16. A method of tethering an object to a support comprising the steps of:
   wrapping an adjustable member around a support;
   securely engaging the adjustable member with a plate;
   seating a rigidly connected foot of a tensioning mechanism on the support between the support and the plate; and
   spacing the plate from the support using the tensioning mechanism to create a tension in the adjustable member, to thereby secure the adjustable member to the support.

17. The method according to claim 16, wherein spacing the plate from the support to create a tension in the adjustable member further creates a clamping tension on opposed sides of the support between the foot of the adjustable member and a support engagement member.

18. An adjustable fastening device configured to engage a support, the adjustable fastening device comprising:
   a plate;
   an adjustable collar configured to extend around the support and securely engage with the plate in operation; and
   a tensioning mechanism, the tensioning mechanism being configured to seat against the support and extend in length to drive the support and the plate apart in operation when the plate is securely engaged with the collar, to thereby move the plate away from the support and to securely engage the collar against the support on an opposed side of the support from the tensioning mechanism, the tensioning mechanism including a rigidly connected foot, the foot including a surface configured for engaging with the support in operation and preventing the tensioning mechanism from being unseated from the support by tension in the collar acting in a direction perpendicularly to a direction of elongation of the tensioning mechanism.

* * * * *